(12) United States Patent
Lin et al.

(10) Patent No.: US 10,168,717 B2
(45) Date of Patent: Jan. 1, 2019

(54) REMOVABLE BALANCED REGULATOR

(71) Applicant: EMERSON PROCESS MANAGEMENT REGULATOR TECHNOLOGIES, INC., McKinney, TX (US)

(72) Inventors: Chun Lin, McKinney, TX (US); Roy R. Pelfrey, Sherman, TX (US)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 122 days.

(21) Appl. No.: 15/233,718

(22) Filed: Aug. 10, 2016

(65) Prior Publication Data
US 2018/0046204 A1 Feb. 15, 2018

(51) Int. Cl.
G05D 16/02 (2006.01)
G05D 16/06 (2006.01)
G05D 16/10 (2006.01)

(52) U.S. Cl.
CPC ......... G05D 16/02 (2013.01); G05D 16/0638 (2013.01); G05D 16/106 (2013.01); *Y10T 137/7801* (2015.04)

(58) Field of Classification Search
CPC ......... Y10T 137/7809; Y10T 137/7812; Y10T 137/7818; Y10T 137/7819; Y10T 137/7831; Y10T 137/7801; G05D 16/02; G05D 16/0694; G05D 16/063; G05D 16/0683; F16K 31/165
See application file for complete search history.

(56) References Cited

U.S. PATENT DOCUMENTS 2,599,577 A * 6/1952 Norgren ............. G05D 16/0663
137/484.8
2,619,983 A * 12/1952 Roberts ................. F16K 31/165
137/116.5
9,678,516 B2 * 6/2017 Fan ....................... G05D 16/106
(Continued)

OTHER PUBLICATIONS

Search Report for International applicaiton No. PCT/US2017/042544, dated Oct. 24, 2017.
(Continued)

*Primary Examiner* — Jessica Cahill
(74) *Attorney, Agent, or Firm* — Marshall Gerstein & Borun LLP

(57) ABSTRACT

A balanced farm tap regulator includes a valve housing having a fluid inlet and a fluid outlet connected by a fluid passageway. A valve seat is disposed in the fluid passageway. A removable balanced plug assembly includes a valve stem having a stem balanced fluid passage, a disk that cooperates with a valve seat to control fluid flow, and a stem guide that is removably attached to the valve housing. The disk includes a disk balanced fluid passage that is fluidly connected with the stem balanced fluid passage. The stem guide is removably attached to the valve housing, the stem guide including an inwardly extending guide flange and an externally extending guide flange. The inwardly extending guide flange cooperates with the valve stem to form a balance chamber, and the stem balanced fluid passage is fluidly connected to the balance chamber and to the disk balanced fluid passage.

18 Claims, 3 Drawing Sheets

(56) References Cited

U.S. PATENT DOCUMENTS

| | | | |
|---|---|---|---|
| 2008/0257418 A1 | 10/2008 | Kranz et al. | |
| 2010/0071786 A1 | 3/2010 | Hawkins et al. | |
| 2014/0083530 A1* | 3/2014 | Fan .................... | G05D 16/0663 137/505.18 |
| 2014/0090719 A1* | 4/2014 | Mevius .................... | F16K 17/02 137/15.24 |
| 2014/0090724 A1* | 4/2014 | Mevius ................. | F16K 31/165 137/488 |
| 2014/0090726 A1* | 4/2014 | Hawkins ............ | G05D 16/0694 137/505.13 |
| 2014/0090727 A1* | 4/2014 | Nguyen ............. | G05D 16/0694 137/505.18 |
| 2014/0261724 A1* | 9/2014 | Fan ..................... | F16K 31/1262 137/15.01 |

OTHER PUBLICATIONS

Written Opinion for International applicaiton No. PCT/US2017/042544, dated Oct. 24, 2017.

\* cited by examiner

REMOVABLE BALANCED REGULATOR

BACKGROUND

Field of the Disclosure

The disclosure relates generally to pressure reducing regulators and more specifically to farm tap pressure reducing regulators for the oil and natural gas industry.

Related Technology

Pressure regulators and pressure regulating valves are used in myriad industrial and residential applications for controlling the downstream pressure of a fluid. For example, in chemical processing plants or oil refineries, pressure regulating valves are used to manipulate a flowing fluid to compensate for increases or decreases in demand, or other load disturbances, and thus keep the fluid pressure regulated. In natural gas delivery systems, pressure regulating valves may be used to reduce gas pressure from transmission pipelines to a distribution tap serving farm for a community. By controlling downstream pressure, pressure regulating valves compensate for variations in downstream demand. For example, as downstream demand increases, pressure regulating valves open to allow more fluid to flow through the pressure regulating valve, thus maintaining a relatively constant downstream pressure. On the other hand, as downstream demand decreases, pressure regulating valves close to reduce the amount of fluid flowing through the pressure regulating valve, again maintaining a relatively constant downstream pressure.

In natural gas distribution systems, one type of pressure regulator is the farm-tap regulator. Farm-tap regulators typically reduce gas pressure from a high pressure side to a low pressure side, for example, when distributing gas from a pipeline (or other delivery mechanism) to multiple dwellings or businesses, such as in a small community. The gas pressure in the pipeline is typically much higher than desired by the end user to ensure that enough gas volume is available to supply the needs of many downstream users. There are two types of farm-tap regulators, flow to open type regulators and a flow to close type regulators.

The flow to open type regulator typically is very sensitive to inlet pressures. More specifically, as inlet pressure increases, the outlet set point also increases, often by a large amount. Additionally, when larger orifices are needed, the flow to open regulator can become pressure limited, due to the force required to overcome the inlet pressure.

The flow to close type regulator encounters problems that are essentially the reverse of the flow to open type regulator. The flow to close type regulator has an outlet set point that decreases as inlet pressure increases. Thus, the flow to close type regulators have limited inlet pressure ranges based on orifice size.

SUMMARY OF THE DISCLOSURE

According to some aspects, a farm tap regulator includes a removable balanced plug assembly that delivers upstream fluid pressure to a balance chamber. The balanced plug assembly reduces inlet sensitivity and increases flow capacity for a given valve seat (or orifice) size.

In one exemplary arrangement, a balanced farm tap regulator includes a valve housing having a fluid inlet and a fluid outlet connected by a fluid passageway. A valve seat is disposed in the fluid passageway. A removable balanced plug assembly includes a valve stem having a stem balanced fluid passage, a disk that cooperates with a valve seat to control fluid flow, and a stem guide that is removably attached to the valve housing. The disk includes a disk balanced fluid passage that is fluidly connected with the stem balanced fluid passage. The stem guide is removably attached to the valve housing, the stem guide including an inwardly extending guide flange and an externally extending guide flange. The inwardly extending guide flange cooperates with the valve stem to form a balance chamber, and the stem balanced fluid passage is fluidly connected to the balance chamber and to the disk balanced fluid passage.

In another exemplary arrangement, a removable balanced plug assembly for a balanced farm tap regulator includes a valve stem having a stem balanced fluid passage, a disk that cooperates with a valve seat to control fluid flow, and a stem guide that is removably attached to the valve housing. The disk includes a disk balanced fluid passage that is fluidly connected with the stem balanced fluid passage. The stem guide is removably attached to the valve housing, the stem guide including an inwardly extending guide flange and an externally extending guide flange. The inwardly extending guide flange cooperates with the valve stem to form a balance chamber, and the stem balanced fluid passage is fluidly connected to the balance chamber and to the disk balanced fluid passage.

In accordance with the teachings of the disclosure, any one or more of the foregoing aspects and/or exemplary aspects of a balanced farm tap regulator or a removable balanced plug assembly may further include any one or more of the following optional forms.

In some optional forms, the valve stem may further include an externally extending stem flange between a first stem end and a second stem end, the externally extending stem flange and the inwardly extending guide flange defining longitudinal limits of the balance chamber.

Still other optional forms may include a first balance chamber seal being disposed in an annular channel formed in the inwardly extending guide flange and a second balance chamber seal disposed in an annular channel formed in an inner surface of the stem guide, proximate the externally extending stem flange.

In yet other optional forms, the second balance chamber seal may be disposed in an annular channel formed in the externally extending stem flange.

In yet other optional forms, a boost body may at least partially surround the stem guide, the boost body may include a boost fluid channel that senses fluid pressure downstream of the valve seat.

In yet other optional forms, the stem guide is removably attached to the boost body by an alignment pin.

In yet other optional forms, a retention cap is removably attached to the stem guide, the retention cap being removably attached to the stem guide at the first stem guide end by a fastener.

In yet other optional forms, the stem guide includes a guide boost channel that is fluidly connected with the boost channel on the boost body.

In yet other optional forms, an actuator is operatively connected to a lever, the actuator moving the lever in response to fluid pressure within the valve housing, and the lever being operatively connected to the valve stem to move the valve stem.

In yet other optional forms, the valve seat is removably attached to the valve housing.

BRIEF DESCRIPTION OF THE DRAWINGS

Objects, features, and advantages of the present invention will become apparent upon reading the following description in conjunction with the drawing figures, in which.

DETAILED DESCRIPTION

Certain examples are shown in the above-identified figures and described in detail below. The figures are not necessarily to scale and certain features and certain views of the figures may be shown exaggerated in scale or in schematic for clarity and/or conciseness. Additionally, any features from any exemplary embodiment may be included with, a replacement for, or otherwise combined with other features to form other embodiments.

Figure 1:
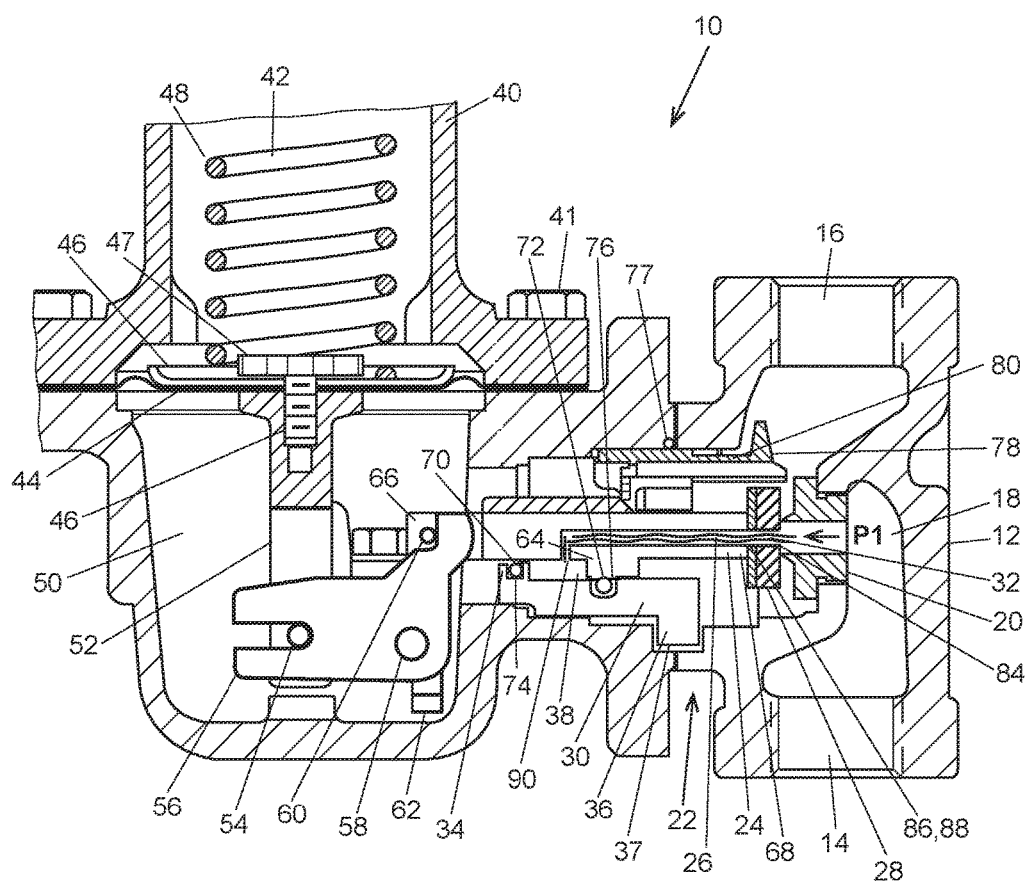
FIG. 1 is a side cross-sectional view of a farm tap regulator constructed in accordance with the teachings of the disclosure.

Turning now to FIG. 1, a balanced farm tap regulator 10 includes a valve housing 12 having a fluid inlet 14 and a fluid outlet 16 connected by a fluid passageway 18. A valve seat 20 is disposed in the fluid passageway 18. A removable balanced plug assembly 22 is disposed in the valve body 12. The removable balanced plug assembly 22 includes a valve stem 24 having a stem balanced fluid passage 26, a disk 28 that cooperates with the valve seat 20 to control fluid flow therethrough, and a stem guide 30 that is removably attached to the valve housing 12. The disk 28 includes a disk balanced fluid passage 32 that is fluidly connected with the stem balanced fluid passage 26. The stem guide 30 includes an inwardly extending guide flange 34 and an externally extending guide flange 36. In some embodiments, the externally extending guide flange 36 may be seated, at least partially within a guide channel 37 formed in an inner surface of the valve housing 12. The guide channel 37 locates and fixes the stem guide 30 within the valve housing 12. The inwardly extending guide flange 34 cooperates with the valve stem 24 to form a balance chamber 38, and the stem balanced fluid passage 26 is fluidly connected to the balance chamber 38 and to the disk balanced fluid passage 32 to deliver upstream fluid pressure to the balance chamber 38.

An actuator casing 40 is attached to the valve housing 12. In one example, the actuator casing 40 may be attached to the valve housing with one or more fasteners 41. The actuator casing 40 contains a control spring 42 and a diaphragm 44. The diaphragm 44 is secured to a diaphragm plate 46 with a diaphragm cap screw 47. The diaphragm 44 separates a control chamber 48 from a pressure sense chamber 50. The diaphragm plate 46 is connected to a pusher post 52. As pressure in the pressure sense chamber 50 changes, the diaphragm 44, and thus the pusher post 52 move up and down in FIG. 1.

The pusher post 52 is includes a drive pin 54 that cooperates with a lever 56. As the pusher post 52, and thus the drive pin 54, moves up and down, the drive pin 54 causes the lever 56 to rotate about a lever pin 58. As the lever 56 rotates about the lever pin 58, the lever 56 moves a stem pin 60 and thus the valve stem 24 ultimately in response to movements of the diaphragm 44 (which is sensitive to pressure differences). In some embodiments, the lever 56 may be held in place by a lever retainer 62.

The valve stem 24 may further include an externally extending stem flange 64 between a first stem end 66 and a second stem end 68, the externally extending stem flange 64 and the inwardly extending guide flange 34 defining longitudinal limits of the balance chamber 38. A first balance chamber seal 70 is disposed in a first annular channel 74 formed in the inwardly extending guide flange 34 and a second balance chamber seal 72 is disposed in a second annular channel 76 formed in an inner surface of the stem guide 30, proximate the externally extending stem flange 64.

The disk balanced fluid passage 32 includes a first disk fluid inlet 84 at a first disk end and a first disk fluid 86 outlet at a second disk end, the disk balanced fluid passage 32 being fluidly connected with the stem balanced fluid passage 26. The stem balanced fluid passage 26 is fluidly connected to the balance chamber 38 at a first stem fluid outlet 90 and to the disk balanced fluid passage 32 at a first stem fluid passage inlet 88. Upstream or inlet fluid pressure is delivered to the balance chamber 38 through the disk balanced fluid passage 32 and the stem balanced fluid passage 26. Thus, upstream or inlet fluid pressure acts on the valve stem 24 in the balance chamber 38 to counter the upstream or inlet fluid pressure acting on the disk 28.

A boost body 78 may at least partially surround the stem guide 30, and the boost body 78 may include a boost fluid channel 80 that senses fluid pressure downstream of the valve seat 20. The boost channel 80 delivers fluid from downstream of the valve seat 20 to the pressure sense chamber 50 to correct or minimize droop. In some embodiments, a boost seal 77 may be disposed between the boost body 78 and the valve housing 12.

Figure 2:
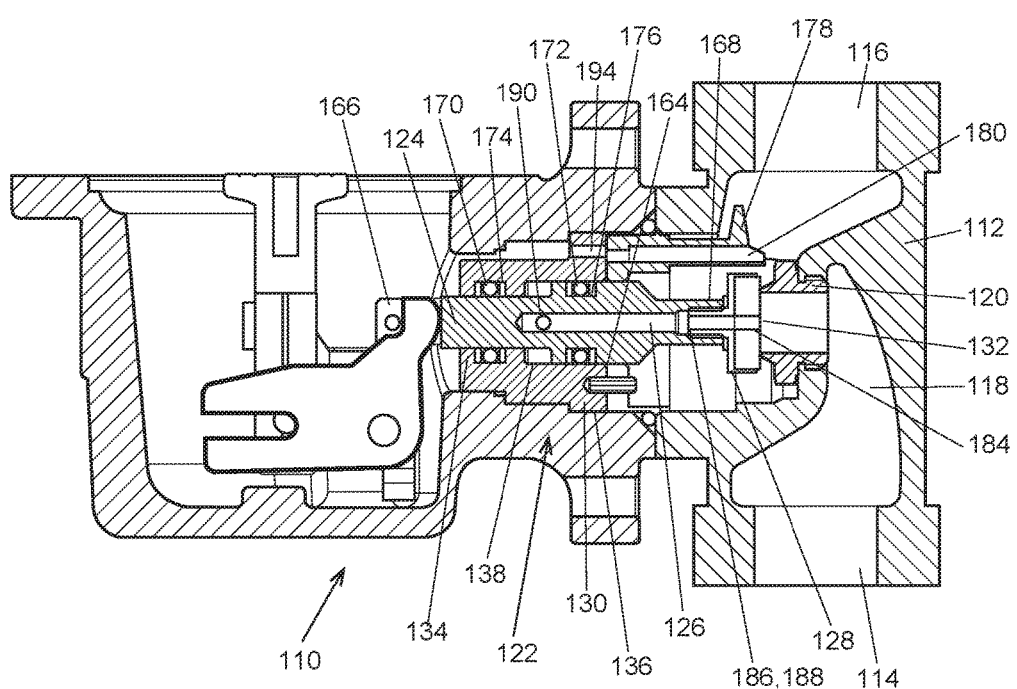
FIG. 2 is a side cross-sectional view of a second embodiment of a farm tap regulator that is constructed in accordance with the teachings of the disclosure.
Figure 3:
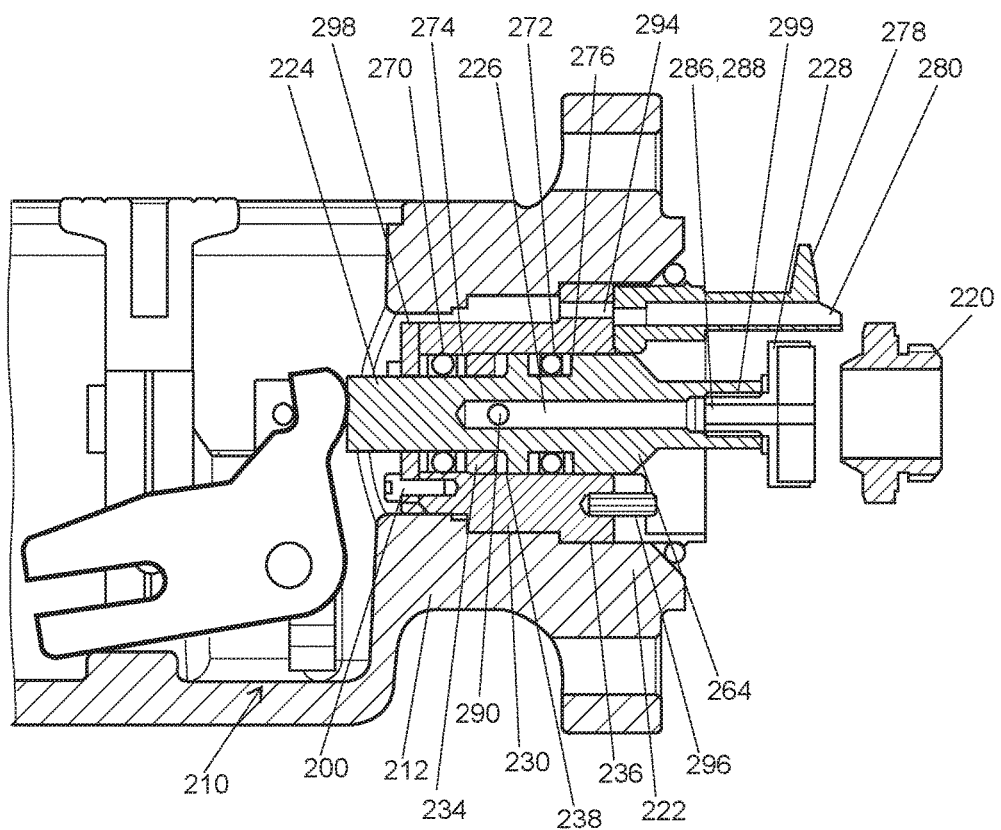
FIG. 3 is a side cross-sectional view of a third embodiment of a farm tap regulator that is constructed in accordance with the teachings of the disclosure.

The embodiments illustrated in FIGS. 2 and 3 are similar to the embodiment illustrated in FIG. 1. Reference numerals for common elements in FIGS. 2 and 3 will be exactly 100 or 200 higher than the corresponding reference numerals in FIG. 1. Additionally, any element described in FIG. 1 is understood to be included in the embodiments of FIGS. 2 and 3 if that element is not specifically described with respect to FIGS. 2 and 3. For example, the actuator casing 40 described in FIG. 1 is not illustrated in FIGS. 2 and 3. However, the embodiments illustrated in FIGS. 2 and 3 are understood to include an actuator (including an actuator casing) even though an actuator is not illustrated.

Turning now to FIG. 2, a balanced farm tap regulator 110 includes a valve housing 112 having a fluid inlet 114 and a fluid outlet 116 connected by a fluid passageway 118. A valve seat 120 is disposed in the fluid passageway 118. A removable balanced plug assembly 122 is disposed in the valve body 112. The removable balanced plug assembly 122 includes a valve stem 124 having a stem balanced fluid passage 126, a disk 128 that cooperates with the valve seat 120 to control fluid flow therethrough, and a stem guide 130 that is removably attached to the valve housing 112. The disk 128 includes a disk balanced fluid passage 132 that is fluidly connected with the stem balanced fluid passage 126. The stem guide 130 includes an inwardly extending guide flange 134 and an externally extending guide flange 136. The inwardly extending guide flange 134 cooperates with the valve stem 124 to form a balance chamber 138, and the stem balanced fluid passage 126 is fluidly connected to the balance chamber 138 and to the disk balanced fluid passage 132 to deliver upstream fluid pressure to the balance chamber 138.

The valve stem 124 may further include an externally extending stem flange 164 between a first stem end 166 and a second stem end 168, the externally extending stem flange 164 and the inwardly extending guide flange 134 defining longitudinal limits of the balance chamber 138. A first balance chamber seal 170 is disposed in a first annular channel 174 formed in the inwardly extending guide flange 134. The embodiment of FIG. 2 differs from that of FIG. 1 in that a second balance chamber seal 172 is disposed in an annular channel 176 formed in the externally extending stem flange 164.

The disk balanced fluid passage 132 includes a first disk fluid inlet 184 at a first disk end and a first disk fluid 186 outlet at a second disk end, the disk balanced fluid passage 132 being fluidly connected with the stem balanced fluid passage 126. The stem balanced fluid passage 126 is fluidly connected to the balance chamber 138 at a first stem fluid outlet 190 and to the disk balanced fluid passage 132 at a first stem fluid passage inlet 188. Upstream or inlet fluid pressure is delivered to the balance chamber 138 through the disk balanced fluid passage 132 and the stem balanced fluid passage 126. Thus, upstream or inlet fluid pressure acts on the valve stem 124 in the balance chamber 138 to counter the upstream or inlet fluid pressure acting on the disk 128.

A boost body 178 may be disposed proximate the stem guide 130, and the boost body 178 may include a boost fluid channel 180 that senses fluid pressure downstream of the valve seat 120. The boost channel 180 delivers fluid from downstream of the valve seat 120 to the pressure sense chamber to correct or minimize droop. The stem guide 130 may also include a stem boost channel 194, which is aligned with the boost channel 180 to continue delivery of the downstream fluid pressure to the pressure sense chamber. Additionally, the stem boost channel 194 is formed in the outwardly extending guide flange 136 such that the outwardly extending flange forms a stop or seat for the boost body 178. The boost body 178 and the stem guide 130 may be removably secured to one another with an alignment pin 96.

Turning now to FIG. 3, a balanced farm tap regulator 210 includes a valve housing 212 having a fluid inlet and a fluid outlet connected by a fluid passageway (which are not illustrated in FIG. 3). A valve seat 220 is disposed in the fluid passageway. A removable balanced plug assembly 222 is disposed in the valve body 212. The removable balanced plug assembly 222 includes a valve stem 224 having a stem balanced fluid passage 226, a disk 228 that cooperates with the valve seat 220 to control fluid flow therethrough, and a stem guide 230 that is removably attached to the valve housing 212. The disk 228 may be removably secured to the valve stem 224 with a removable connection 299, such as a threaded connection so that the disk 228 may be changed when needed to adjust to a different size valve seat 220. The disk 228 includes a disk balanced fluid passage 232 that is fluidly connected with the stem balanced fluid passage 226. The stem guide 230 includes an inwardly extending guide flange 234 and an externally extending guide flange 236. The inwardly extending guide flange 234 cooperates with the valve stem 224 to form a balance chamber 238, and the stem balanced fluid passage 226 is fluidly connected to the balance chamber 238 and to the disk balanced fluid passage 232 to deliver upstream fluid pressure to the balance chamber 238.

The valve stem 224 may further include an externally extending stem flange 264 between a first stem end and a second stem end, the externally extending stem flange 264 and the inwardly extending guide flange 234 defining longitudinal limits of the balance chamber 238. A first balance chamber seal 270 is disposed in a first annular channel 274 formed in the inwardly extending guide flange 234. Similar to the embodiment of FIG. 2, a second balance chamber seal 272 is disposed in an annular channel 276 formed in the externally extending stem flange 264. In the embodiment of FIG. 3, the first annular channel 274 extends rearward, out of the internally extending guide flange 234. As a result, a retention cap 298 is located aft of the internally extending guide flange 234 to retain the first balance chamber seal 270 in the first annular channel 274. In the embodiment of FIG. 3, the first annular channel 274 is easier to machine due to the orientation of the first annular channel 274. The retention cap 298 is removably secured to the stem guide 230 with a fastener 200.

The disk balanced fluid passage 232 includes a first disk fluid inlet 284 at a first disk end and a first disk fluid 286 outlet at a second disk end, the disk balanced fluid passage 232 being fluidly connected with the stem balanced fluid passage 226. The stem balanced fluid passage 226 is fluidly connected to the balance chamber 238 at a first stem fluid outlet 290 and to the disk balanced fluid passage 232 at a first stem fluid passage inlet 288. Upstream or inlet fluid pressure is delivered to the balance chamber 238 through the disk balanced fluid passage 232 and the stem balanced fluid passage 226. Thus, upstream or inlet fluid pressure acts on the valve stem 224 in the balance chamber 238 to counter the upstream or inlet fluid pressure acting on the disk 228.

A boost body 278 may be disposed proximate the stem guide 230, and the boost body 278 may include a boost fluid channel 280 that senses fluid pressure downstream of the valve seat 220. The boost channel 280 delivers fluid from downstream of the valve seat 220 to the pressure sense chamber to correct or minimize droop. The stem guide 230 may also include a stem boost channel 294, which is aligned with the boost channel 280 to continue delivery of the downstream fluid pressure to the pressure sense chamber. Additionally, the stem boost channel 294 is formed in the outwardly extending guide flange 236 such that the outwardly extending flange forms a stop or seat for the boost body 278. The boost body 278 and the stem guide 230 may be removably secured to one another with an alignment pin 296.

The disclosed balanced farm tap regulators and removable balanced plug assemblies advantageously minimize inlet sensitivity by porting upstream or inlet fluid pressure to the balance chamber. This allows the farm tap regulators to handle inlet pressures up to about 2000 psig. Furthermore, the disclosed balanced farm tap regulators and removable balanced plug assemblies advantageously include various orifice sizes with inlet pressures up to about 2000 psig. In other words, the disclosed balanced farm tap regulators and removable balanced plug assemblies provide increased flow capacities with larger orifice sizes.

Still further, the disclosed balanced farm tap regulators and removable balanced plug assemblies advantageously provide more consistent setpoints for given inlet pressures. Finally, the disclosed removable balanced plug assemblies may be advantageously retrofitted to existing farm tap regulators for improved performance.

Although certain balanced farm tap regulators and removable balanced plug assemblies for farm tap regulators have been described herein in accordance with the teachings of the present disclosure, the scope of coverage of this patent is not limited thereto. On the contrary, while the invention has been shown and described in connection with various preferred embodiments, it is apparent that certain changes and modifications, in addition to those mentioned above, may be made. This patent covers all embodiments of the teachings of the disclosure that fairly fall within the scope of permissible equivalents. Accordingly, it is the intention to protect all variations and modifications that may occur to one of ordinary skill in the art.

The invention claimed is:

1. A removable balanced plug assembly for a balanced tap regulator, the removable balanced plug assembly comprising:
   a valve stem that is adapted to be movable within a valve housing, the valve stem including a stem balanced fluid passage having a stem fluid inlet at a first passage end and a stem fluid outlet at a second passage end, and an externally extending stem flange between a first stem end and a second stem end;
   a disk that is adapted to cooperate with a valve seat, the disk being removably attached to the valve stem, and the disk including a disk balanced fluid passage, the disk balanced fluid passage having a disk fluid inlet at a first disk end and a disk fluid outlet at a second disk end, the disk balanced fluid passage being fluidly connected with the stem balanced fluid passage; and
   a stem guide adapted to be removably attached to the valve housing, the stem guide including an inwardly extending guide flange at a first stem guide end and an externally extending guide flange at a second stem guide end, the stem guide slidably retaining the valve stem;
   wherein the inwardly extending guide flange cooperates with the externally extending stem flange to form a balance chamber, the externally extending stem flange and the inwardly extending guide flange defining longitudinal limits of the balance chamber, and the stem balanced fluid passage being fluidly connected to the balance chamber at the stem fluid outlet and to the disk balanced fluid passage at the stem fluid inlet.

2. The removable balanced plug assembly of claim 1, further comprising a first balance chamber seal that is disposed in an annular channel formed in the inwardly extending guide flange.

3. The removable balanced plug assembly of claim 2, further comprising a second balance chamber seal that is disposed in an annular channel formed in an inner surface of the stem guide, proximate the externally extending stem flange.

4. The removable balanced plug assembly of claim 2, further comprising a second balance chamber seal that is disposed in an annular channel formed in the externally extending stem flange.

5. The removable balanced plug assembly of claim 1, further comprising a boost body at least partially surrounding the stem guide, the boost body including a boost fluid channel for sensing fluid pressure downstream of the valve seat.

6. The removable balanced plug assembly of claim 5, wherein the stem guide is removably attached to the boost body with an alignment pin.

7. The removable balanced plug assembly of claim 6, further comprising a retention cap that is removably attached to the stem guide, the retention cap being removably attached to the stem guide at the first stem guide end with a fastener and the boost body being removably attached to the stem guide at the second stem guide end.

8. The removable balanced plug assembly of claim 6, wherein the stem guide includes a guide boost channel that is fluidly connected with the boost channel on the boost body.

9. A balanced farm tap regulator comprising:
   a valve housing having a fluid inlet and a fluid outlet connected by a fluid passageway;
   a valve seat disposed in the fluid passageway;
   a valve stem that is longitudinally movable within the valve housing, the valve stem including a stem balanced fluid passage having a stem fluid inlet at a first passage end and a stem fluid outlet at a second passage end, and an externally extending stem flange between a first stem end and a second stem end;
   a disk that cooperates with the valve seat to control fluid flow therethrough, the disk being removably attached to the valve stem, and the disk including a disk balanced fluid passage, the disk balanced fluid passage having a disk fluid inlet at a first disk end and a disk fluid outlet at a second disk end, the disk balanced fluid passage being fluidly connected with the stem balanced fluid passage; and
   a stem guide removably attached to the valve housing, the stem guide including an inwardly extending guide flange at a first stem guide end and an externally extending guide flange at a second stem guide end;
   wherein the inwardly extending guide flange cooperates with the externally extending stem flange to form a balance chamber, the externally extending stem flange and the inwardly extending guide flange defining longitudinal limits of the balance chamber, and the stem balanced fluid passage being fluidly connected to the balance chamber at the stem fluid outlet and to the disk balanced fluid passage at the stem fluid inlet.

10. The balanced farm tap regulator of claim 9, further comprising a first balance chamber seal being disposed in an annular channel formed in the inwardly extending guide flange.

11. The balanced farm tap regulator of claim 10, further comprising a second balance chamber seal being disposed in an annular channel formed in an inner surface of the stem guide, proximate the externally extending stem flange.

12. The balanced farm tap regulator of claim 10, further comprising a second balance chamber seal being disposed in an annular channel formed in the externally extending stem flange.

13. The balanced farm tap regulator of claim 9, further comprising a boost body at least partially surrounding the stem guide, the boost body including a boost fluid channel that senses fluid pressure downstream of the valve seat.

14. The balanced tap regulator of claim 13, wherein the stem guide is removably attached to the boost body by an alignment pin.

15. The balanced farm tap regulator of claim 14, further comprising a retention cap that is removably attached to the stem guide, the retention cap being removably attached to the stem guide at the first stem guide end by a fastener and the boost body being removably attached to the stem guide at the second stem guide end.

16. The balanced farm tap regulator of claim 14, wherein the stem guide includes a guide boost channel that is fluidly connected with the boost channel on the boost body.

17. The balanced farm tap regulator of claim 9, further comprising an actuator that is operatively connected to a lever, the actuator moving the lever in response to fluid pressure within the valve housing, and the lever being operatively connected to the valve stem.

18. The balanced farm tap regulator of claim 17, wherein the valve seat is removably attached to the valve housing.

* * * * *

UNITED STATES PATENT AND TRADEMARK OFFICE
CERTIFICATE OF CORRECTION

PATENT NO. : 10,168,717 B2  
APPLICATION NO. : 15/233718  
DATED : January 1, 2019  
INVENTOR(S) : Chun Lin et al.

Page 1 of 1

It is certified that error appears in the above-identified patent and that said Letters Patent is hereby corrected as shown below:

On the Title Page

Item [74], delete "Marshall Gerstein & Borun LLP" and insert -- Marshall, Gerstein & Borun LLP --.

In the Claims

Column 8, Line 47, delete "balanced tap regulator" and insert -- balanced farm tap regulator --.

Signed and Sealed this  
Fourteenth Day of April, 2020

Andrei Iancu  
*Director of the United States Patent and Trademark Office*